United States Patent
Mori

(10) Patent No.: US 7,792,422 B2
(45) Date of Patent: Sep. 7, 2010

(54) LENS BARREL

(75) Inventor: Yoshitaka Mori, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 646 days.

(21) Appl. No.: 11/645,050

(22) Filed: Dec. 26, 2006

(65) Prior Publication Data

US 2007/0147818 A1 Jun. 28, 2007

(30) Foreign Application Priority Data

Dec. 27, 2005 (JP) .............................. 2005-375829

(51) Int. Cl.
*G02B 7/04* (2006.01)
(52) U.S. Cl. ...................... 396/144; 396/147
(58) Field of Classification Search ........... 396/144, 396/147, 85, 86; 359/425, 611, 704, 826, 359/827, 825
See application file for complete search history.

(56) References Cited

U.S. PATENT DOCUMENTS

| | | | | |
|---|---|---|---|---|
| 3,119,891 A | * | 1/1964 | Ferrari et al. | ............... 359/823 |
| 3,850,507 A | * | 11/1974 | Uesugi | ........................ 359/695 |
| 4,110,769 A | | 8/1978 | Schutz et al. | |
| 4,130,340 A | * | 12/1978 | Kooi | ........................... 359/425 |
| 4,148,562 A | * | 4/1979 | Sawano | ...................... 359/825 |
| 4,309,077 A | | 1/1982 | Tomori | |
| 4,896,951 A | * | 1/1990 | Atsuta et al. | ................. 359/696 |
| 5,239,417 A | * | 8/1993 | Eguchi et al. | ............... 359/823 |
| 5,267,044 A | * | 11/1993 | Nozaki et al. | ............... 348/347 |
| 5,282,090 A | | 1/1994 | Suzuki et al. | |
| 5,771,410 A | * | 6/1998 | Sato et al. | ...................... 396/79 |
| 7,046,457 B2 | | 5/2006 | Nakamura | |
| 2004/0081442 A1 | | 4/2004 | Suzuki | |
| 2005/0078382 A1 | | 4/2005 | Nakamura | |
| 2006/0158745 A1 | | 7/2006 | Nakamura | |
| 2008/0055746 A1 | * | 3/2008 | Wei-An | ...................... 359/819 |

FOREIGN PATENT DOCUMENTS

JP 2005-121745 A 5/2005

* cited by examiner

*Primary Examiner*—W. B. Perkey
*Assistant Examiner*—Warren K Fenwick
(74) *Attorney, Agent, or Firm*—Birch, Stewart, Kolasch & Birch, LLP

(57) ABSTRACT

A lens barrel comprises: a first focus ring used for either one of instruction types of focus operation of a relative position instruction type focus operation for moving a position of the focus lens for focus control and an absolute position instruction type focus operation for moving it in an absolute positional relation; a second focus ring used for the focus operation of the instruction type different from that of the first focus ring between the relative position and the absolute position instruction type focus operation; a support device which slidably supports the first focus ring; a connecting device which brings the first focus ring and the second focus ring from an unconnected state into a connected state when the first focus ring is slid from a first position to a second position; and a cover member covering the outer circumference portion of the second focus ring.

9 Claims, 11 Drawing Sheets

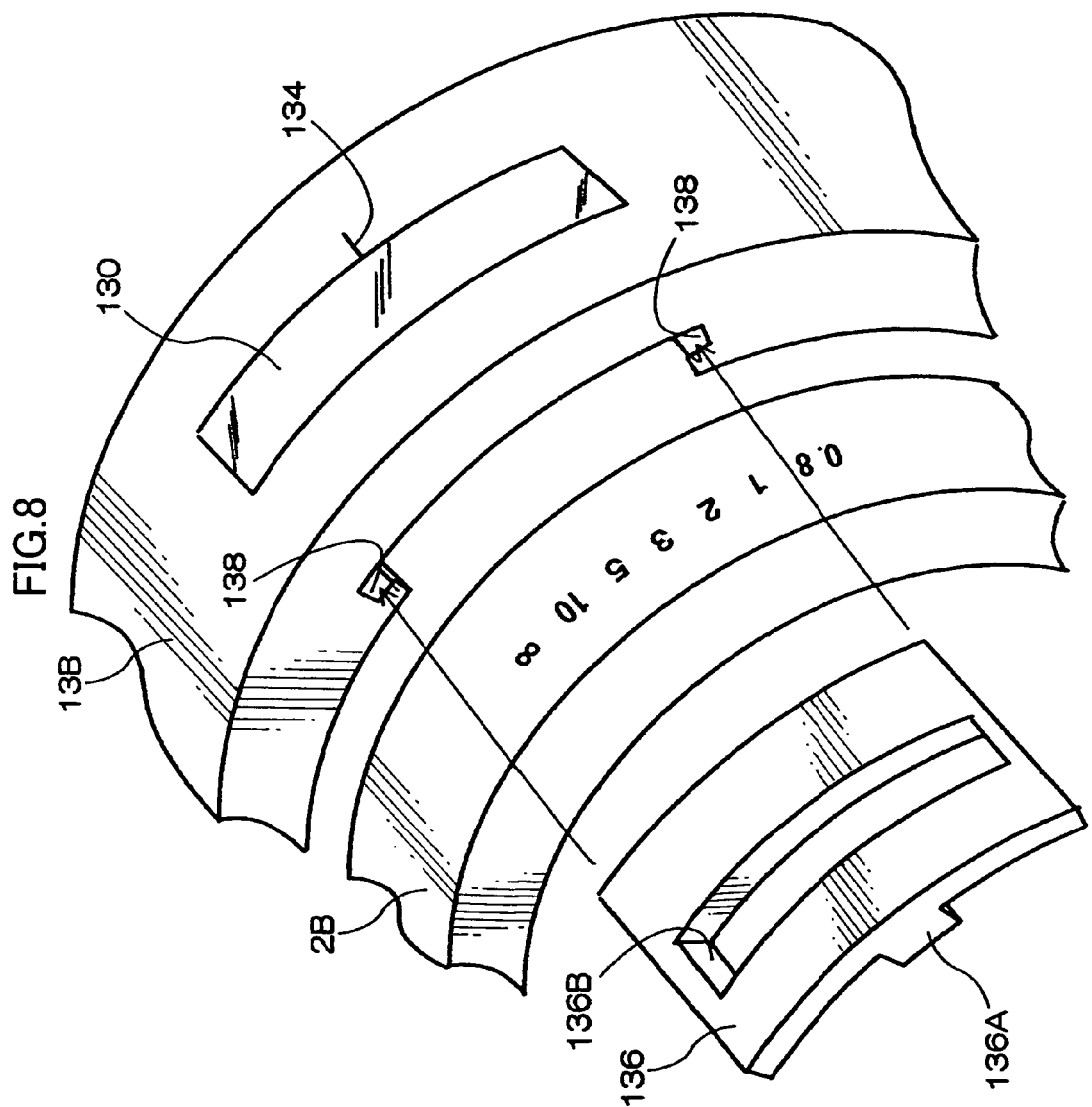

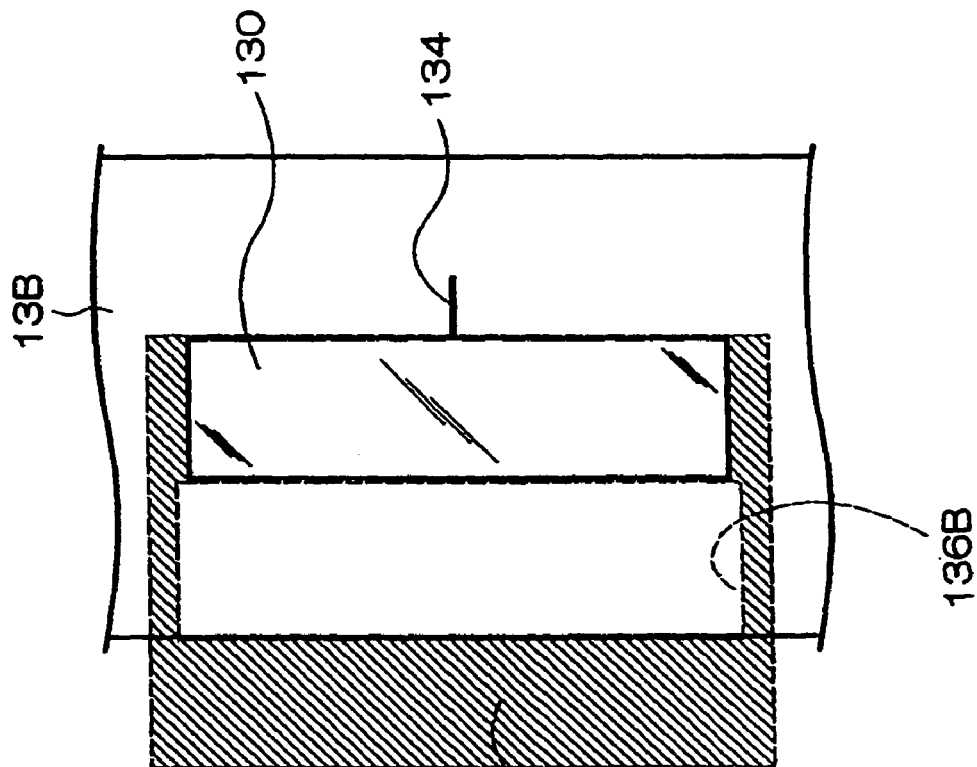
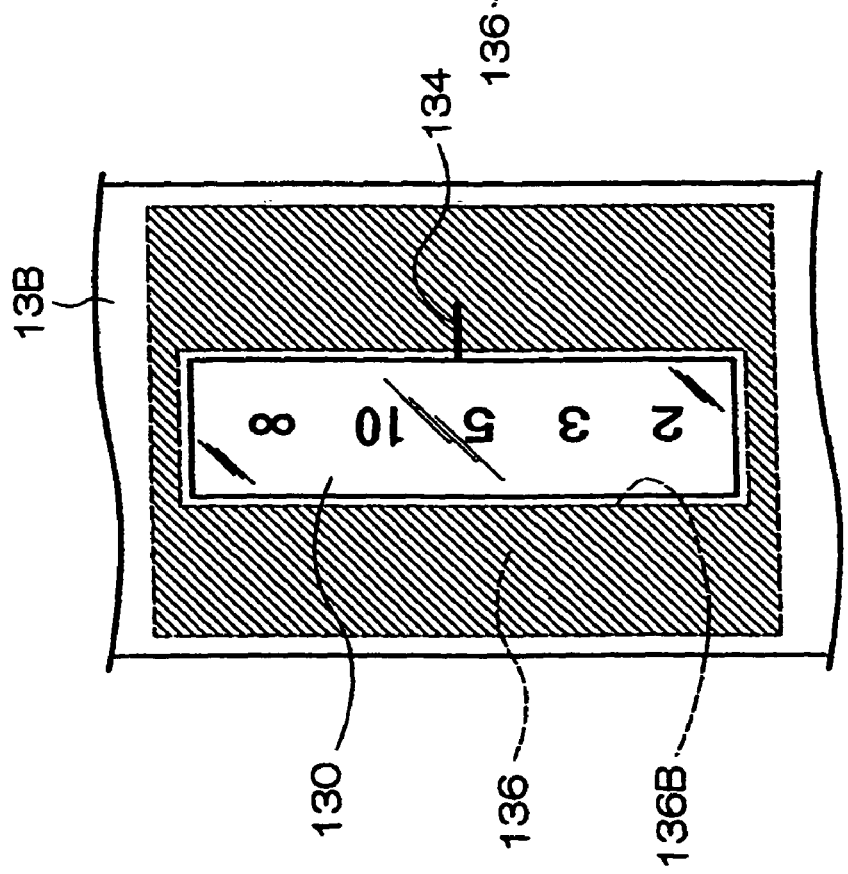
FIG.11A
FIG.11B

LENS BARREL

BACKGROUND OF THE INVENTION

1. Field of the Invention

The present invention relates to a lens barrel and particularly to a lens barrel provided with a focus ring for focusing operation and a mechanism for driving the focus lens by a motor according to a rotation position of the focus ring by electrically detecting the rotation position of the focus ring.

2. Description of the Related Art

A consumer video camera in general has an automatic focus function so that focusing can be controlled by switching between automatic focus and manual focus. Thus, a lens for focus control (focus lens) is driven by a motor, and a manual focus is carried out by electrically detecting the rotation position of a focus ring provided rotatably at a lens barrel by a position sensor, for example, and by moving the focus lens by the motor according to the detected rotation position. And the focus ring and the focus lens are so constructed that they are not mechanically interlocked with each other (See Japanese Patent Application Laid-Open No. 2005-121745, for example).

And in a lens barrel used in this kind of video camera, a position sensor of a relative position detection type such as an encoder is often used, not a position sensor of an absolute position detection type such as a potentiometer as the position sensor for detecting the rotation position of the focus ring. The focus ring is also different from the lens barrel generally used for broadcasting or professional use but is capable of endless rotation without its rotation range restricted by a close-up end and an infinite end. This has the following advantages. For example, when a target subject is out of focus in executing focus control by automatic focus, focus control by the focus ring might be desired by switching from the automatic focus to the manual focus. In this case, when the automatic focus is switched to the manual focus, the focus lens is preferably moved by a displacement amount according to an operation amount of the focus ring (rotation change amount) after being switched to the manual focus based on the focus position at that time. That is, if the focus position set by the automatic focus is effectively taken over to change the focus position by the manual focus, the manual focus can be used as a focus correcting device or the like for the automatic focus. Suppose that a position sensor of the absolute position detection type is used for detection of the rotation position of the focus ring and a limit (end) is posed on the rotation range of the focus ring, such a nonconformity is generated that the focus lens can not be moved to the close-up end or the infinite end even if the focus ring is rotated to the position at the end. That is, an actual focus position when the automatic focus is switched to the manual focus is deviated from the focus position which should be set for the rotation position of the focus ring at that time. And if the focus lens is moved by the displacement amount according to the operation amount of the focus ring after being switched to the manual focus as above, the deviation is kept in the subsequent operation of the focus ring. Therefore, a phenomenon occurs that even if the focus ring is operated to the position at the end of the rotation range, the focus lens is not moved to the close-up end or the infinite end. If a position sensor of the relative position detection type is used for detection of the rotation position of the focus ring and a limitation (end) is not posed on the rotation range of the focus ring, the above nonconformity can be avoided.

The infinite focus ring having its rotation position detected by a position sensor of the relative position detection type and capable of endless rotation shall be called as a relative position instruction type focus ring (which moves the position of the focus lens in a relative position relation with respect to the rotation position of the focus ring), instructing a relative position of the focus lens, and the focus operation by that shall be called as a relative position instruction type focus operation. On the other hand, the focus ring having its rotation position detected by the absolute position detection type position sensor and a limitation posed on the rotation range (having a regulation end) shall be called as an absolute position instruction type focus ring (which moves the position of the focus lens in an absolute position relation with respect to the rotation position of the focus ring), instructing the absolute position of the focus lens, and the focus operation by that as an absolute position instruction type focus operation.

SUMMARY OF THE INVENTION

A high-end model of video camera marketed for consumers has a performance level which can be also used for broadcasting or professional operation and are actually used for news gathering for TV broadcasting in many cases. On the other hand, professional photographers using video camera (TV camera) for broadcasting or professional use control focus by manual focus in many cases, and in the lens barrel of a photographing lens used for broadcasting, the focus ring is mechanically interlocked with the focus lens in general, and an end to restrict subsequent rotation is provided at the rotation position of the focus ring when the focus lens reaches the position of close-up end or infinite end. Therefore, the professional photographers are used to recognize by an operation feeling when the focus ring hits the end that the focus lens has reached the position of the close-up end or the infinite end. When these professional photographers use the above relative position instructing type focus ring, they can not recognize that the focus lens has reached the close-up end or infinite end by the operation feeling of the focus ring, and there is nonconformity that the operability is poor.

Then, as a measure considering the operability of focus when a video camera is used as consumer use and the operability of focus when the video camera is used for broadcasting, two focus rings of the relative position instruction type and the absolute position instruction type are provided at a lens barrel so that the focus rings can be used according to preference or the like of users. According to this idea, users who mainly use automatic focus and users who use the manual focus as a correcting device for focus control by the automatic focus can now use the relative position instruction type focus ring, while users who mainly use the manual focus (professional photographers and the like) can use the absolute position instruction type focus ring, which realizes favorable focus operation for any user.

However, if there are different instruction types of focus rings in one lens barrel, there is a fear of wrong operation of an instruction type focus ring not intended to be operated by the user taken it as the other focus ring or unintentional touching and moving of it. Therefore, a measure to prevent such a wrong operation is required.

The present invention has been made in view of the above circumstances and has an object to provide a lens barrel which can prevent nonconformity to erroneously operate an instruction type focus ring not intended to be operated by the user when a relative position instruction type and an absolute position instruction type focus rings are provided at a lens barrel.

In order to achieve the above object, a lens barrel described in a first aspect of the present invention comprises a first focus ring, which is a focus ring rotatably arranged on an outer circumference portion of a barrel body holding an optical system capable of focus control and used for either one of instruction types of focus operation of a relative position instruction type focus operation for moving a position of the focus lens for focus control with respect to an optical axis direction in a relative positional relation to a rotation position of the focus ring and an absolute position instruction type focus operation for moving it in an absolute positional relation, a second focus ring, which is a focus ring arranged rotatably on the outer circumference portion of the barrel body holding the optical system capable of focus control and used for the focus operation of the instruction type different from that of the first focus ring between the relative position instruction type focus operation and the absolute position instruction type focus operation, a support device which slidably supports the first focus ring in the optical axis direction, a connecting device which brings the first focus ring and the second focus ring from an unconnected state into a connected state when the first focus ring slidably supported by the support device is slid from a first position to a second position, and a cover member covering the outer circumference portion of the second focus ring.

According to the present invention, when the relative position instruction type and the absolute position instruction type focus rings are arranged on the barrel body, the first focus ring can be switched to a state of connection or disconnection with the second focus ring by sliding the first focus ring used for one of the instruction types. Therefore, the second focus ring can be rotationally operated by the first focus ring, and there is no need of rotational operation by directly touching the second focus ring. Then, by covering the second focus ring by the cover member, nonconformity of erroneous operation of the focus ring of the instruction type not intended to be operated by the operator can be prevented.

The lens barrel described in a second aspect of the present invention is characterized in that, in the invention described in the first aspect, the first focus ring is used for focus operation of the relative position instruction type and the second focus ring is used for the focus operation of the absolute position instruction type, and an opening is formed on the cover member for visual check of indication of a photographing distance marked on the second focus ring from outside.

According to the present invention, it is effective to use the first focus ring which is slidable and operated through direct touch by the operator for the relative position instruction type focus operation and to apply the indication of the photographing distance usually marked on the absolute position instruction type focus ring to the second focus ring when the second focus ring covered by the cover member for the absolute position instruction type focus operation is used, and in that case, the opening is formed on the cover member to prevent inability to visually check the indication due to the cover member.

The lens barrel described in a third aspect of the present invention further comprises a shielding device which shields the opening when the first focus ring is set to the first position in the invention described in the second aspect.

According to the present invention, when the first focus ring is set to a first position used for the relative position instruction type focus operation, the second focus ring is not rotated but a device-position instruction type focus operation is carried out and at the relative position instruction type focus operation, the photographing distance indicated by the second focus ring is invalid, and thus, the indication of the photographing distance is shielded to prevent wrong recognition.

According to the lens barrel of the present invention, when the two focus rings of the relative position instruction type and the absolute position instruction type are provided at the lens barrel, the nonconformity that the user erroneously operates the focus ring of the instruction type not intended to be operated can be prevented.

BRIEF DESCRIPTION OF THE DRAWINGS

FIG. 8 is an exploded perspective view showing a part of the second focus ring and a cover portion of a fixing member in an enlarged manner;

FIGS. 11A and 11B are explanatory views used for description on indication of a photographing distance in the window of the cover portion of the fixing member.

DETAILED DESCRIPTION OF THE PREFERRED EMBODIMENTS

The best mode for carrying out the lens barrel according to the present invention will be described below based on the attached drawings.

Figure 1:
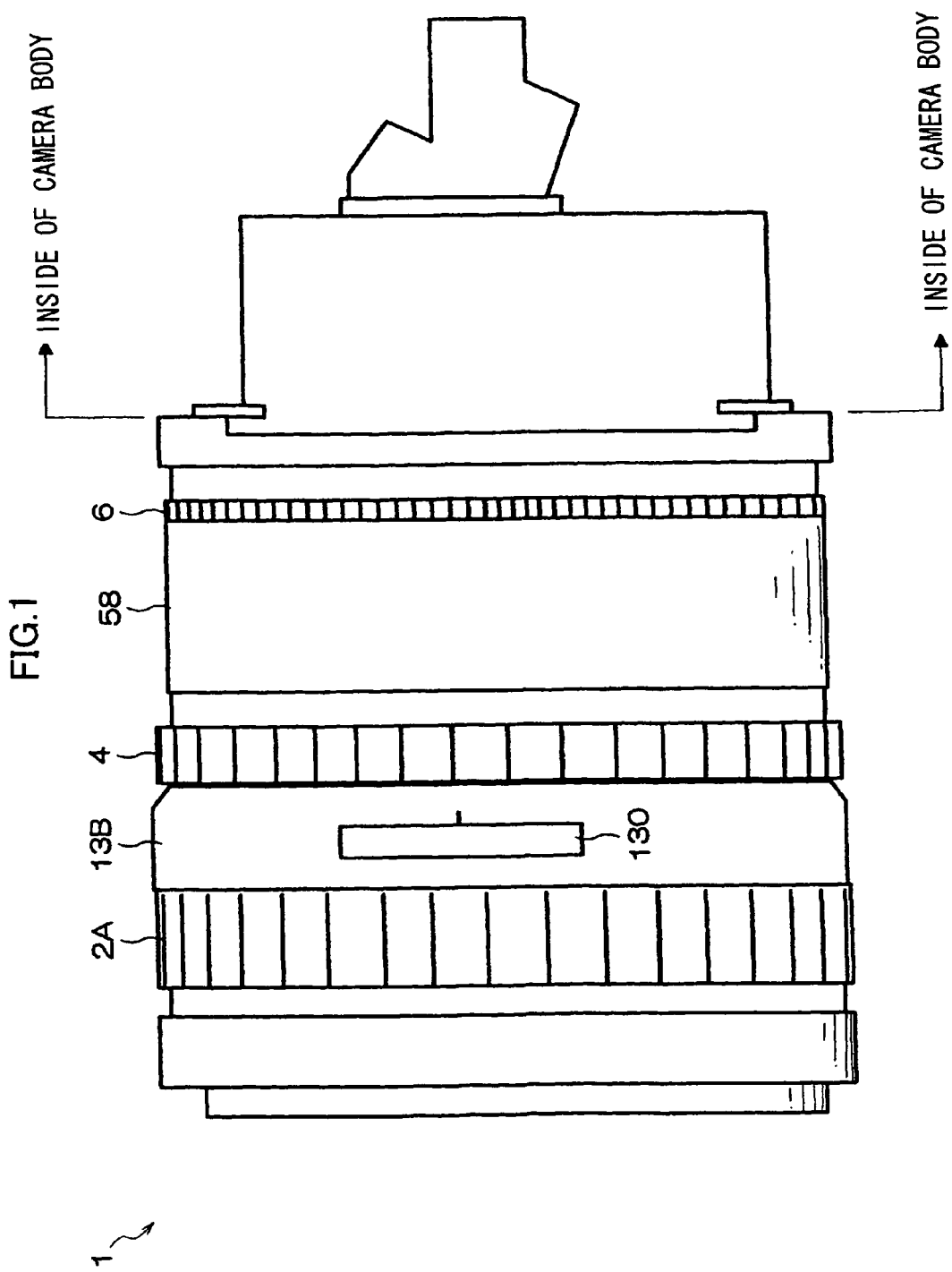
FIG. 1 is a side view showing an appearance of a lens barrel according to the present invention.
Figure 2:
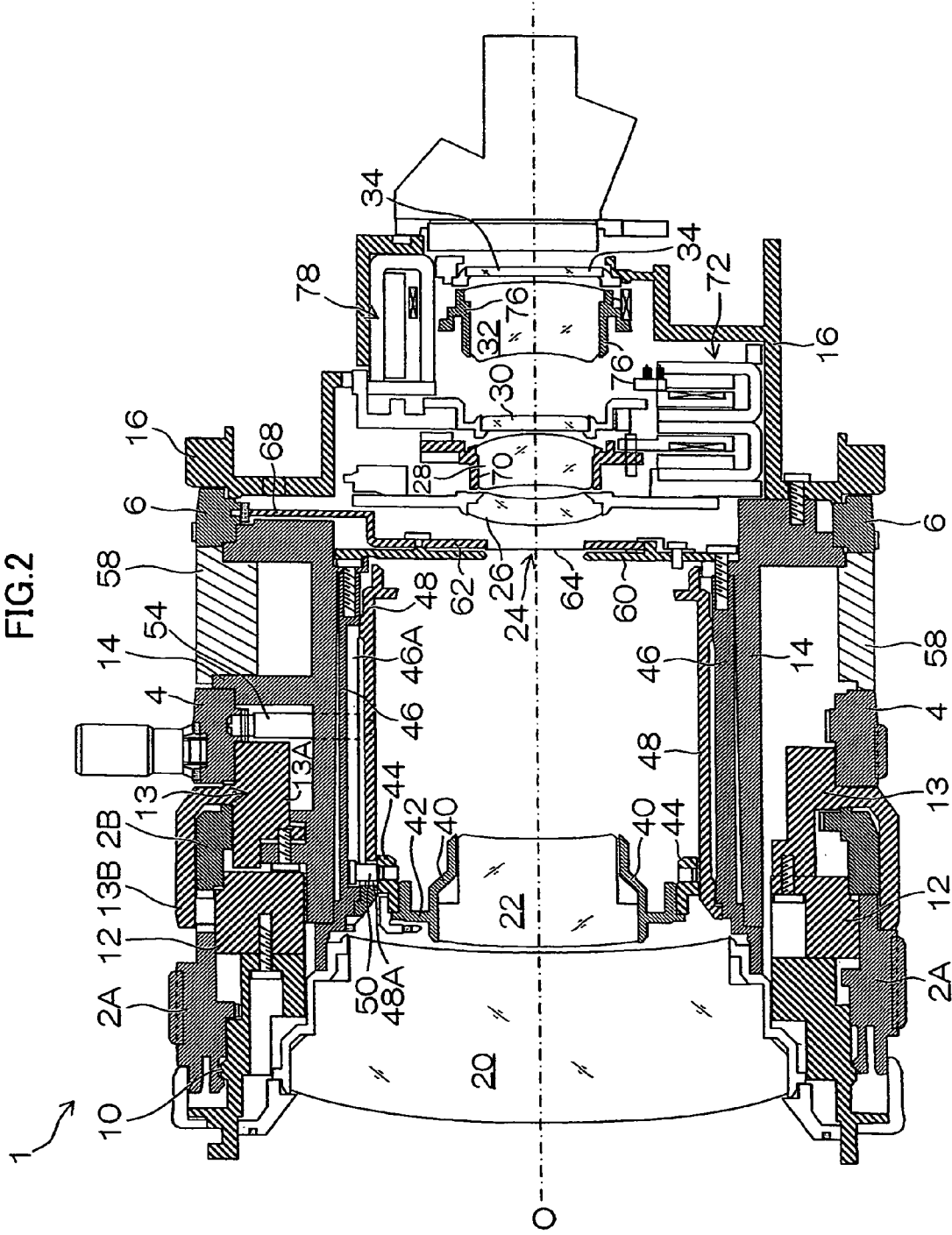
FIG. 2 is a side sectional view of the lens barrel according to the present invention.

FIGS. 1 and 2 show a side view and a side sectional view, respectively, showing a lens barrel in a rear-focus type variable focal distance photographing lens applied to a video camera for consumers, an ENG camera for TV broadcasting, a monitoring camera and the like, for example, to which the present invention is applied. In these figures, a lens barrel used mainly in the video camera for consumers is shown, and an optical block such as color separation prism attached on a camera body with interchangeable lenses is integrally mounted at a rear end of a lens barrel 1.

In FIG. 1, the lens barrel 1 is constructed in the substantially cylindrical shape and it is fixed to an enclosure of a camera body in the state where a part of the rear end side is inserted into the enclosure of the camera body, not shown. Rotatable operation rings are provided on an outer circumference portion of the lens barrel 1, and a first focus ring 2A, a zoom ring 4, and an iris ring 6 are provided in the order from a subject side (front side). An operator can carry out focus control, zoom control and diaphragm control by rotationally operating those operation rings.

In FIG. 2, a fixed cylinder (barrel body) of the lens barrel 1 mainly comprises a front frame 10, a fixed ring 12, a fixing member 13, an intermediate fixed cylinder 14 and a rear fixed cylinder 16, and the front frame 10 is fixed to the fixed ring 12, the fixed ring 12 to the fixing member 13, the fixing member 13 to the intermediate fixed cylinder 14, and the intermediate fixed cylinder 14 to the rear fixed cylinder 16 by screws, respectively. The rear fixed cylinder 16 is fixed to the enclosure of the camera body. Each member constituting the lens barrel 1 is supported by the front frame 10, the fixed ring 12, the fixing member 13, the intermediate fixed cylinder 14 and the rear fixed cylinder 16.

On an optical axis O of the lens barrel 1, a fixed lens (group) 20, a zoom (variable power) lens (group) 22, a diaphragm 24, a fixed lens (group) 26, a vibration-resistant lens (group) 28, a fixed lens (group) 30, a focus lens (group) 32, a fixed lens (group) 34 and the like are arranged in the order from the subject side as an optical system forming an image of the subject.

The zoom lens 22 is to change a zoom factor of the optical system (focal distance) and is arranged inside the intermediate fixed cylinder 14 movable in the optical axis O direction in the state held by a holding frame 40. A flange portion 42 is formed in the holding frame 40 of the zoom lens 22 and is connected to a moving cylinder 44 through the flange portion 42. An intermediate cylinder 46 is fixed to the inner circumference portion of the intermediate fixed cylinder 14, a rotating cylinder 48 is rotatably held by the inner circumference portion of the intermediate cylinder 46, and the moving cylinder 44 is held by the inner circumference portion of the rotating cylinder 48.

Also, a straight groove 46A in the optical axis O direction is formed on the inner circumferential face of the intermediate cylinder 46, a cam groove (hole in the cam shape) 48A is formed in the rotating cylinder 48, and a cam pin 50 fixed to the moving cylinder 44 is inserted through the cam groove 48A of the rotating cylinder 48 and engaged with the straight groove 46A of the intermediate cylinder 46. By this, the moving cylinder 44 is moved straight in the optical axis O direction in the state where rotation is restricted, and the cam pin 50 is held at a position where it is engaged with the cam groove 48A. When the rotating cylinder 48 is rotated, a crossing position between the cam groove 48A of the rotating cylinder 48 and the straight groove 46A of the intermediate cylinder 46 is changed to a position according to the cam shape, and by movement of the cam pin 50 to the crossing position, the moving cylinder 44 is advanced/retreated in the optical axis O direction.

On the other hand, on the outer circumference portion of the intermediate fixed cylinder 14, the zoom ring 4 is rotatably arranged, and a rod-state connecting shaft 54 is mounted inward in the radial direction of the inner circumferential face of the zoom ring 4. This connecting shaft 54 is inserted through a circumferential long hole (not shown) formed in the intermediate fixed cylinder 14 and the intermediate cylinder 46 and connected to the rotating cylinder 48. By this, when the zoom ring 4 is rotationally operated, the rotating cylinder 48 is rotated in conjunction with it. When the rotating cylinder 48 is rotated, the moving cylinder 44 is advanced/retreated as mentioned above, and the zoom lens 22 is moved in the optical axis O direction in conjunction with the moving cylinder 44. Therefore, the zoom factor is changed by rotational operation of the zoom ring 4. In the rear side of the zoom ring 4, a decorative ring 58 is fixed to the intermediate fixed cylinder 14, and a required switch member and the like are disposed on the decorative ring 58.

A diaphragm 24 is constructed capable of opening/closing operation by diaphragm blades 64 arranged between a bottom plate 60 and a cam plate 62. The iris ring 6 is rotatably disposed between the intermediate fixed cylinder 14 and the rear fixed cylinder 16, and the iris ring 6 and the cam plate 62 are connected to each other by a connecting shaft 68. By this, the diaphragm 24 is opened/closed by rotational operation of the iris ring 6.

The vibration resistant lens 28 is arranged to correct (prevent) image shake by vibration generated in the lens barrel 1 and supported by a support mechanism, not shown, movably in the vertical direction and the horizontal direction in a plane crossing the optical axis. The vibration resistant lens 28 is held by a holding frame 70, and on the lower side and the right side of the holding frame 70 seen from the subject side of the optical axis O direction, a voice coil motor (hereinafter as VCM) 72 for driving the vibration resistant lens 28 in the vertical direction and the VCM, not shown, for driving in the horizontal direction are connected, respectively. By this, when the lens barrel 1 is vibrated vertically and horizontally, the vibration resistant lens 28 is displaced vertically and horizontally to cancel the image shake by the vibration so that the image shake is prevented.

The focus lens 32 is to change the focal position of the optical system and is movably supported in the optical axis O direction. Also, the focus lens 32 is not driven mechanically but driven electrically by power of the VCM. The focus lens 32 is held by a holding frame 76, and on the upper side and the left side of the holding frame 76 when seen from the subject side of the optical axis O direction, a VCM 78 for driving the focus lens 32 in the optical axis O direction and the VCM, not shown, are connected. By the power of these two VCM, the holding frame 76 is guided by a guide rod, not shown, in the optical axis O direction to be advanced/retreated in the optical axis O direction and at the same time, the focus lens 32 is advanced/retreated in the optical axis O direction in conjunction with it.

On the other hand, as will be described in detail later, on the outer circumference portions of the front frame 10 and the fixed ring 12 of the lens barrel 1, a first focus ring 2A is rotatably arranged, and on the outer circumference portions of the fixed ring 12 and the body portion 13A of the fixing member 13, a second focus ring 2B is rotatably arranged in the state covered by a cover portion 13B of the fixing member 13. The rotation positions of the first focus ring 2A and the second focus ring 2B are detected by a predetermined position sensor as will be described later, and a VCM for driving the focus lens 32 so that the focus lens 32 is moved to a position corresponding to the rotation position detected by the position sensor is controlled by a control portion, not shown. By this, when the focus ring 2A or the focus ring 2B is rotationally operated, the focus lens 32 is moved in the optical axis O direction by the power of the VCM in conjunction with it, and the distance to the focused subject (photographing distance) is changed. A circuit (such as CPU) constituting the control portion is arranged in the camera body or the lens barrel.

Figure 3:
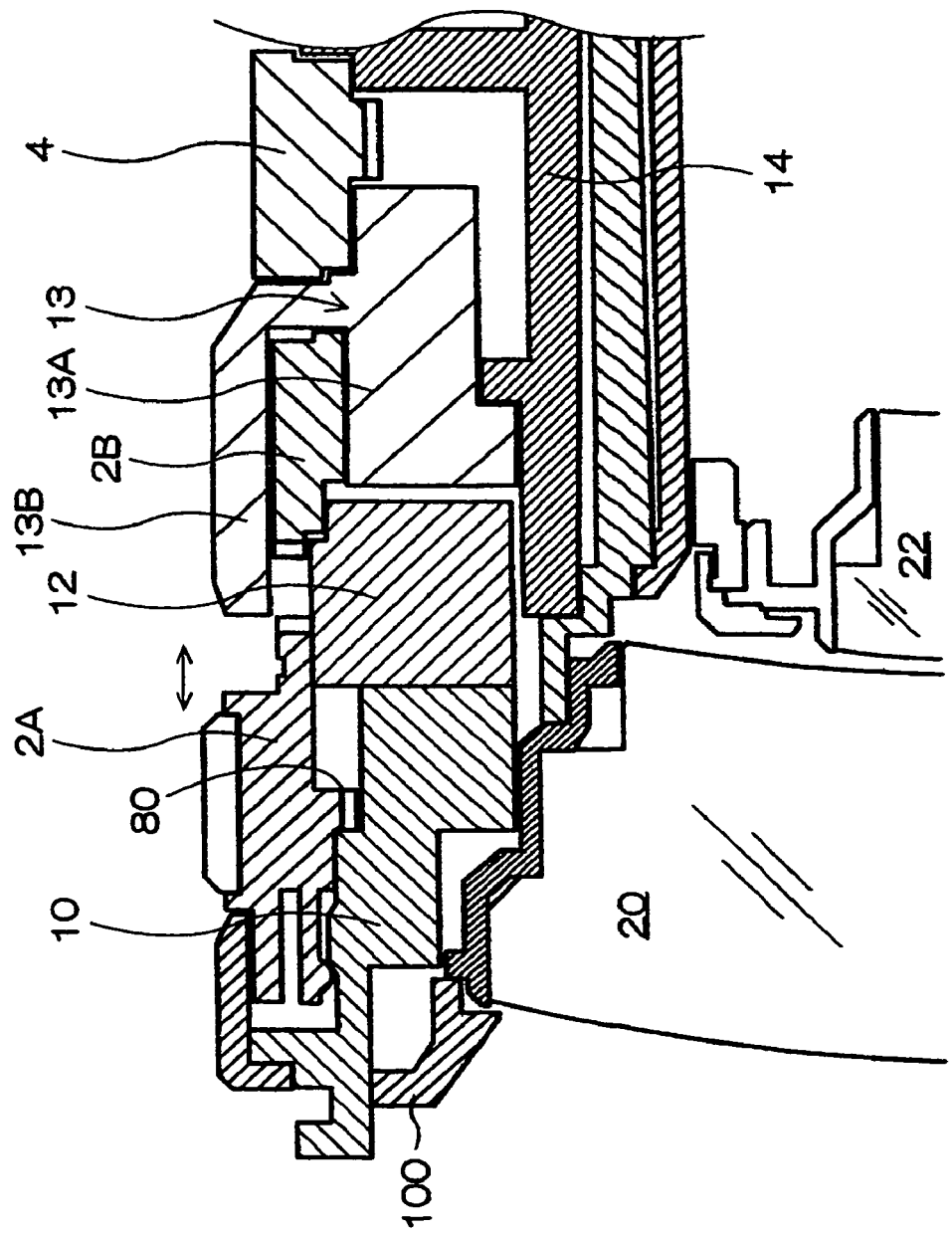
FIG. 3 is a side sectional view of an essential part of the lens barrel according to the present invention.

Constituting portions in the above constructed lens barrel 1 relating to the first focus ring 2A and the second focus ring 2B for focus control will be described below. FIG. 3 is a side sectional view showing a part of the tip end side of the lens barrel 1 in FIGS. 1 and 2 in a section in the cut-off direction different from that in FIG. 2. In this figure, the front frame 10, the fixed ring 12, the fixing member 13 and the intermediate fixed cylinder 14 constituting the fixed cylinder of the lens barrel 1 are integrally connected as above, and the fixed lens 20 is held inside the front frame 10 and the zoom lens 22 is held inside the intermediate fixed cylinder 14. Since the constituting members and the like arranged between the intermediate fixed cylinder 14 and the zoom lens 22 are as mentioned above, the description will be omitted here.

Figure 4:
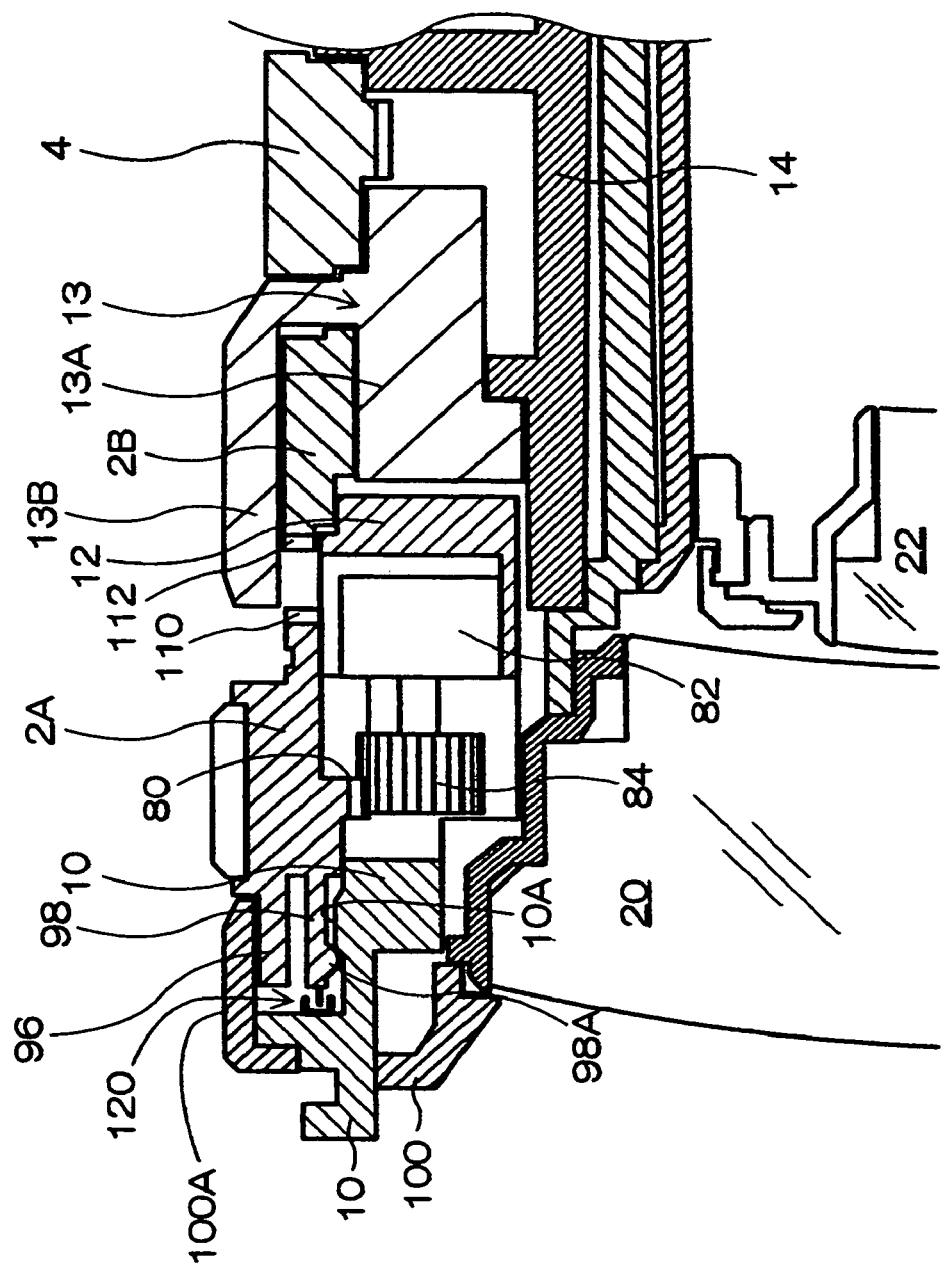
FIG. 4 is a side sectional view showing a section in another cut-away direction of the essential part of the lens barrel according to the present invention.

In the outer circumference portion of the front frame 10, the endless first focus ring 2A which can be rotated endlessly in the circumferential direction (rotating direction with the optical axis O as the rotating axis) is provided. A circumferential gear portion 80 is formed in this inner circumference portion, and to the gear portion 80, a detection shaft of a position sensor is connected. As shown in FIG. 4 showing the side section in the cut-off direction different from that in FIG. 3, as a relative position detection type position sensor such as an incremental rotary encoder 82 (hereinafter referred to as the encoder 82) is mounted in a cavity portion formed in a part of the fixed ring 12, and a gear 84 of the detection shaft of the encoder 82 is meshed with the gear portion 80 of the first focus ring 2A. The first focus ring 2A whose rotation position is detected by the relative position detection type position sensor in this way and capable of endless rotation does not instruct a position of the focus lens 32 by its absolute rotation position but is used as a relative position instruction type focus ring to instruct movement of the focus lens 32 from the current position to a displaced position by a displacement amount according to the operation amount (rotation change amount). A focus operation mode to move the focus lens by this type of relative position instruction type focus ring shall be referred to as the relative position instruction type focus operation.

Figure 5:
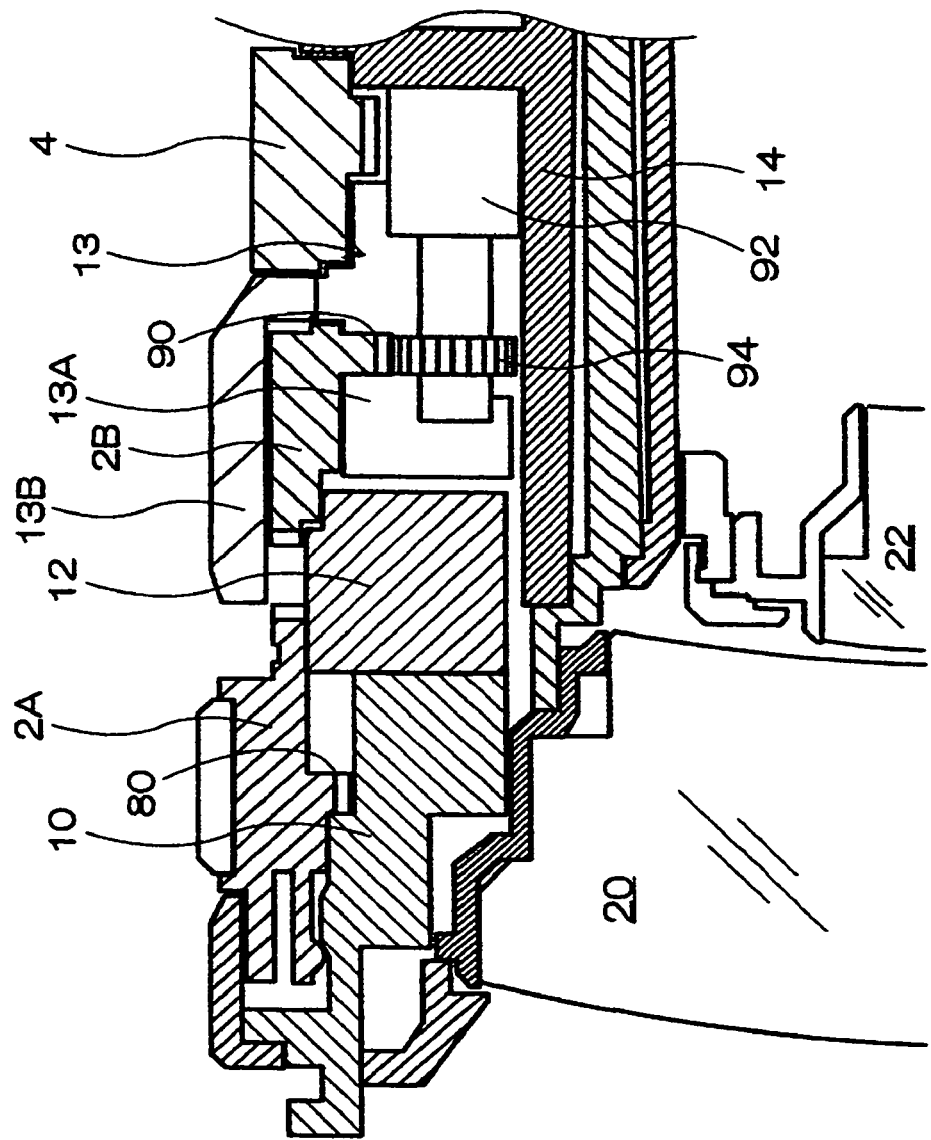
FIG. 5 is a side sectional view showing a section in another cut-away direction of the essential part of the lens barrel according to the present invention.

On the other hand, on the outer circumference portion of the fixed ring 12 and the body portion 13A of the fixing member 13, the second focus ring 2B capable of rotation in a given angular range in the circumferential direction (rotating direction with the optical axis O as the rotating axis) is provided. As shown in FIG. 5 showing the section in the cut-off direction different from that in FIGS. 3 and 4, a circumferential gear portion 90 is formed on the inner circumferential face of the second focus ring 2B. On the other hand, in a cavity portion formed in a part of the fixing member 13, a potentiometer 92 as the absolute position detection type position sensor is placed. A gear 94 of the detection shaft of the potentiometer 92 is meshed with the gear portion 90 of the second focus ring 2B. The second focus ring 2B whose rotation position is detected by the absolute position detection type position sensor and whose rotation range is limited (having an end) in a predetermined angle in this way is used as the absolute position instruction type focus ring which instructs movement of the focus lens 32 to a position corresponding to its absolute rotation position. A focus operation mode to move the focus lens 32 by this absolute position instruction type focus ring shall be referred to as the absolute position instruction type focus operation.

Though its construction will be described later, in this lens barrel 1, the first focus ring 2A can be slidably operated in the optical axis O direction, and specified positions are provided where the sliding operation is more restricted than the other positions at two front and rear locations when the first focus ring 2A is slid forward/backward in the optical axis O direction. And by setting the first focus ring 2A to the front-side specified position (hereinafter referred to as the front-side specified position), the relative position instruction type focus operation can be selected, while by setting the first focus ring 2A to the rear-side specified position (hereinafter referred to as rear-side specified position), the absolute position instruction type focus operation can be selected. Also, if the first focus ring 2A is set to the rear-side specified position to select the absolute position instruction type, the first focus ring 2A is connected to the second focus ring 2B, and the second focus ring 2B can be indirectly operated rotationally by rotational operation of the first focus ring 2A.

Figure 6:
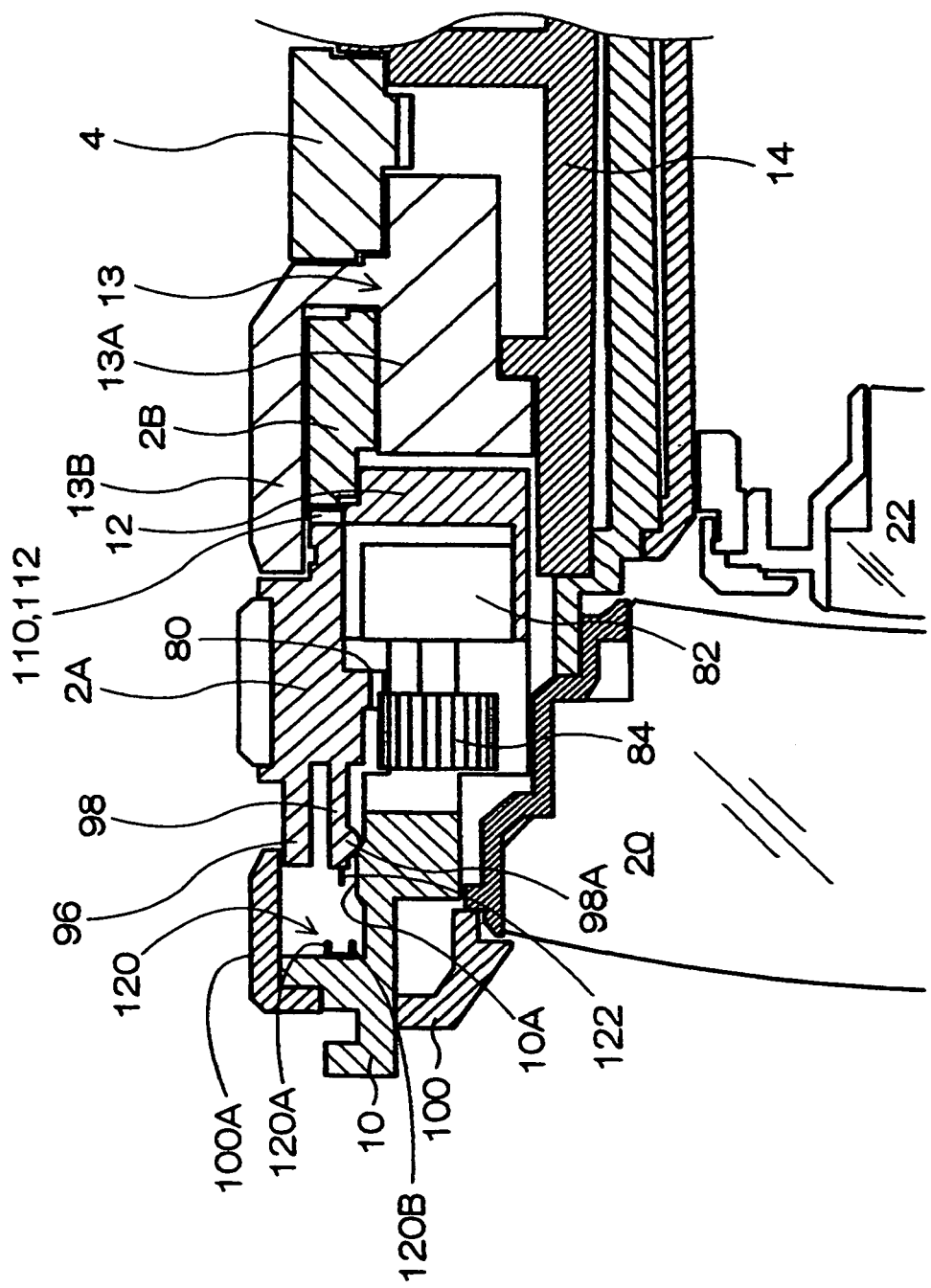
FIG. 6 is a side sectional view showing a section in the same cut direction as that in FIG. 4 of the essential part of the lens barrel according to the present invention and side sectional view showing a state where a first focus ring is set at a rear-side specified position.

FIGS. 3 to 5 show a state where the first focus ring 2A is set to the front-side specified position, while FIG. 6 showing the section in the same cut-off direction as that of the side sectional view of FIG. 4 shows a state where the first focus ring 2A is set to the rear-side specified position. As shown in these figures, projections 96, 98 having the bifurcated section are formed at the whole or a part of the circumferential direction of the front side of the first focus ring 2A, and a projection 98A is formed on the inner circumferential face side of the inner projection 98. A front face frame 100 is mounted to the front side of the front frame 10, and the projections 96, 98 of the first focus ring 2A are fitted between the side wall portion 100A of the front face frame 100 and the front frame 10.

On the other hand, on the outer circumferential face of the front frame 10, a projecting streak portion 10A raised in the radial direction is formed over the entire circumference in the circumferential direction. When the first focus ring 2A is set to the front-side specified position as in FIG. 4, the projection 98A of the first focus ring 2A is locked by the front-side end of the projecting stream portion 10A of the front frame 10 and the sliding operation of the first focus ring 2A to the rear side is restricted. Also, the sliding operation of the first focus ring 2A to the front side is restricted by contact of the gear portion 80 projected at the first focus ring 2A with a step of the front frame 10. By this, in the state in FIG. 3, the sliding operation of the first focus ring 2A in the optical axis O direction is restricted.

In the state in FIG. 4, when a force more than specified is applied to the first focus ring 2A to the rear direction, the restriction on the sliding operation by the projection 98A of the first focus ring 2A and the front-side end of the projecting streak portion 10A of the front frame 10 is released, and sliding becomes capable to a rear-side specified position where the rear end of the first focus ring 2A and the front end of the second focus ring 2B are brought into contact as shown in FIG. 6. When the first focus ring 2A is set to the rear-side specified position, the projection 98A of the first focus ring 2A is locked by the rear-side end of the projecting streak portion 10A of the front frame 10, and the sliding operation of the first focus ring 2A to the front side is restricted. The sliding operation of the first focus ring 2A to the rear side is restricted by contact with the rear end of the first focus ring 2A and the front end of the second focus ring 2B. By this, in the state in FIG. 6, the sliding operation of the first focus ring 2A in the optical axis O direction is restricted.

Figure 7B:
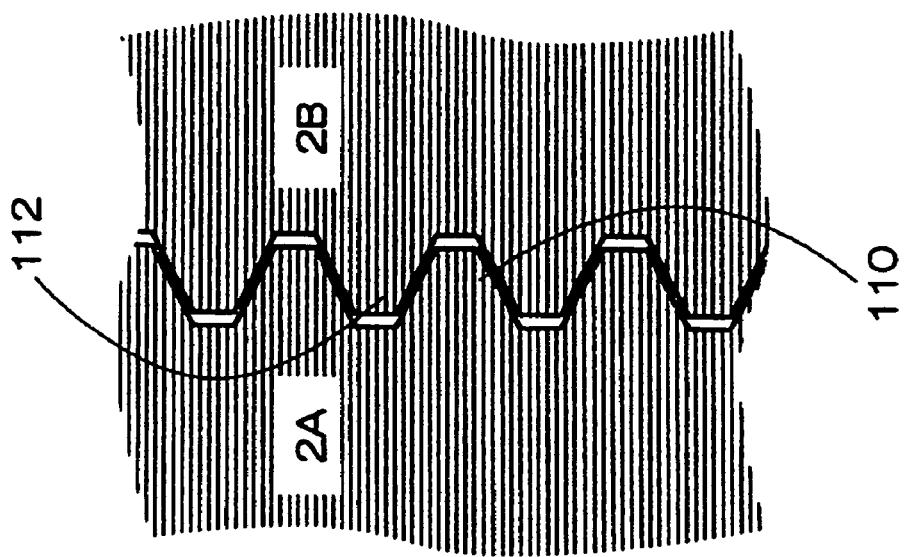
FIGS. 7A and 7B are an enlarged view showing a rear end of the first focus ring and a front end of a second focus ring, respectively.
Figure 7A:
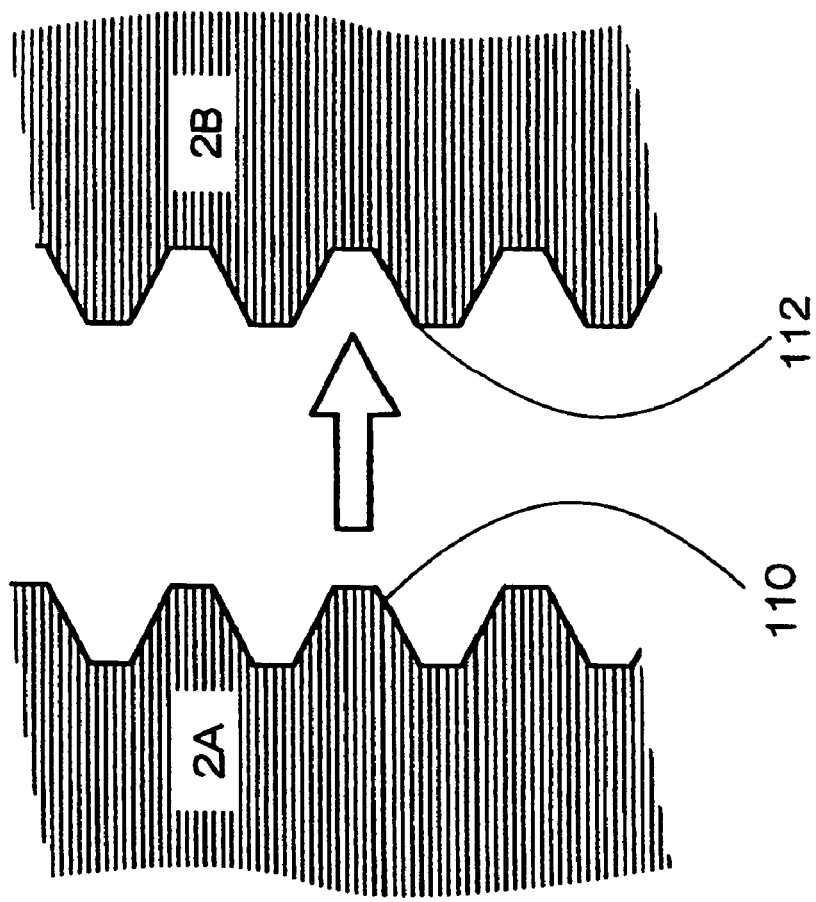

Also, on the rear end face of the first focus ring 2A and the front end face of the second focus ring 2B, gears 110, 112 capable of being meshed with each other are formed as shown in FIGS. 7A and 7B, and by sliding the first focus ring 2A in the optical axis O direction to enable connection and disconnection of those gears, they act as clutches. When the first focus ring 2A is set to the front-side specified position as in FIGS. 3 to 5, the connection of the gears 110, 112 are released as in FIG. 7A, and even if the first focus ring 2A is rotationally operated, the second focus ring 2B is not rotated but only the first focus ring 2A is rotated.

On the other hand, when the first focus ring 2A is set to the rear-side specified as shown in FIG. 6, these gears 110, 112 are connected as in FIG. 7B, and when the first focus ring 2A is rotationally operated, the second focus ring 2B is rotated in conjunction with it. By this, when the first focus ring 2A is set to the rear-side specified position to select the absolute position instruction type focus operation, the second focus ring can be rotationally operated indirectly by the rotational operation of the first focus ring 2A.

As mentioned above, since the operation to select from the relative position instruction type and the absolute position instruction type focus operation and the focus operation itself can be all carried out by the first focus ring 2A irrespective of the selected focus operation type, transfer from type switching to the subsequent focus operation can be realized rapidly.

Also, in this lens barrel 1, in the control portion, not shown, for controlling the focus lens 32, a sensor is provided for detecting to which position of the front-side specified position and the rear-side specified position the first focus ring 2A is set in order to detect which of the relative position instruction type or the absolute position instruction type focus operation is selected. For example, a photo interrupter 120 of a transmission type is placed at the projection in the radial direction of the front frame 10 as shown in FIGS. 4, 6. This photo interrupter 120 is provided with a light emitting portion 120A and the light receiving portion 120B arranged oppositely on the upper side and the lower side in the figures. On the other hand, at the tip end of the first focus ring 2A, a light shield 122 is placed, and the light shield 122 is inserted between the light emitting portion 120A and the light receiving portion 120B of the photo interrupter 120 when the first focus ring 2A is set to the front-side specified position as shown in FIG. 4, and the light emitted from the light emitting portion 120A is shielded by the light shield 122. At this time, the light emitted from the light emitting portion 120A is not detected at the light receiving portion 120B, and an off signal, for example, is outputted from the photo interrupter 120.

On the other hand, when the first focus ring 2A is set to the rear-end specified position as shown in FIG. 6, the light shield 122 is at the position retreated from between the light emitting portion 120A and the light receiving portion 120B of the photo interrupter 120, and the light emitted from the light emitting portion 120A is detected at the light receiving portion 120B. At this time, an ON signal, for example, is outputted from the photo interrupter 120.

Therefore, which of the front-side specified position and the rear-side specified position the first focus ring 2A is set to can be detected by the ON/OFF signal outputted from the photo interrupter 120.

The control portion controlling the focus lens 32 obtains the ON/OFF signal from the photo interrupter 120 as above and detects which of the front-side specified position and the rear-side specified position the first focus ring 2A is set to. If it is detected to be set to the front-side specified position (when the off signal is obtained from the photo interrupter 120), the relative position instruction type focus operation is considered to be selected, and the position of the focus lens 32 is controlled based on the rotation position of the first focus ring 2A.

That is, the control portion counts a pulse signal from the encoder 82 connected to the first focus ring 2A by a counter and controls the VCM (the VCM 78 shown in FIG. 2 and the VCM, not shown) for driving the focus lens 32 so that the focus lens 32 is moved from the current position by a displacement amount corresponding to the change amount of the counted count value.

According to this, irrespective of the position of the focus lens 32 when the operation of the first focus ring 2A is started, the focus lens 32 can be moved by the displacement amount according to the operation amount of the first focus ring 2A from the currently set position. Also, since the first focus ring 2A can be rotated in the endless manner, even if the correspondence between the absolute rotation position of the first focus ring 2A and the position of the focus lens 32 is changed, the focus lens 32 can be surely moved from the close-up end to the infinite end position. Therefore, when a camera is provided with an automatic focus function for automatically moving the focus lens 32 to the focal position, even if the focus lens 32 is moved irrespective of the operation of the first focus ring 2A or the second focus ring 2B by executing the automatic focus function, when the relative position instruction type focus operation has been selected, the focus lens 32 can be displaced from the position set by the automatic focus by a portion operated by the first focus ring 2A by effectively taking over the position set by the automatic focus at switching to the manual focus.

On the other hand, when the control portion detects from the ON/OFF signal from the photo interrupter 120 that the first focus ring 2A is set to the rear-side specified position (when the on signal is obtained from the photo interrupter 120), it considers that the absolute position instruction type focus operation is selected and controls the position of the focus lens 32 based on the rotation position of the second focus ring 2B.

That is, the control portion obtains a voltage signal from the potentiometer 92 connected to the second focus ring 2B and controls the VCM for driving the focus lens 32 so that the focus lens 32 is moved to a position associated with the voltage signal value in advance.

According to this, the rotation range of the second focus ring 2B is limited in a range of ends as the close-up end and the infinite end of the focus lens 32, and the operator can recognize that the focus lens 32 has reached the close-up end or the infinite end by the operating feeling when the second focus ring 2B has reached the end. Such a focus operation by the focus ring is a method which professional photographers are used to and is suitable for operators who feel a sense of discomfort in the relative position instruction type focus operation.

It may be so constructed that the focus control by the automatic focus function is allowed only when the first focus ring 2A is set to the front-side specified position, that is, when the relative position instruction type focus operation is selected and that execution of the automatic focus function is prohibited when the absolute position instruction type focus operation is selected. Also, when macro photographing is available, the macro photographing may be allowed only when the first focus ring 2A is set to the front-side specified position.

According to the construction of the lens barrel 1, it is not necessary for the operator to directly touch the second focus ring 2B for operation. Then, in this lens barrel 1, the whole outer circumferential face side of the second focus ring 2B is covered by a cover portion 13B integrally formed at the body portion 13A of the fixing member 13 as shown in FIG. 3 and the like. By this, the operator can not directly touch the second focus ring 2B, and an erroneous unintentional operation to move the second focus ring 2B by the operator is prevented.

Also, when the absolute position instruction type focus operation is selected, the absolute rotation position of the second focus ring 2B corresponds to the photographing distance (subject distance) in the one-to-one manner. Then, when the absolute position instruction type focus operation is selected, as shown in FIG. 1, indication of the photographing distance marked on the second focus ring 2B can be visually checked through a window 130 of the cover portion 13B of the fixing member 13 covering the outer circumference portion of the second focus ring 2B as shown in FIG. 1.

Figure 9:
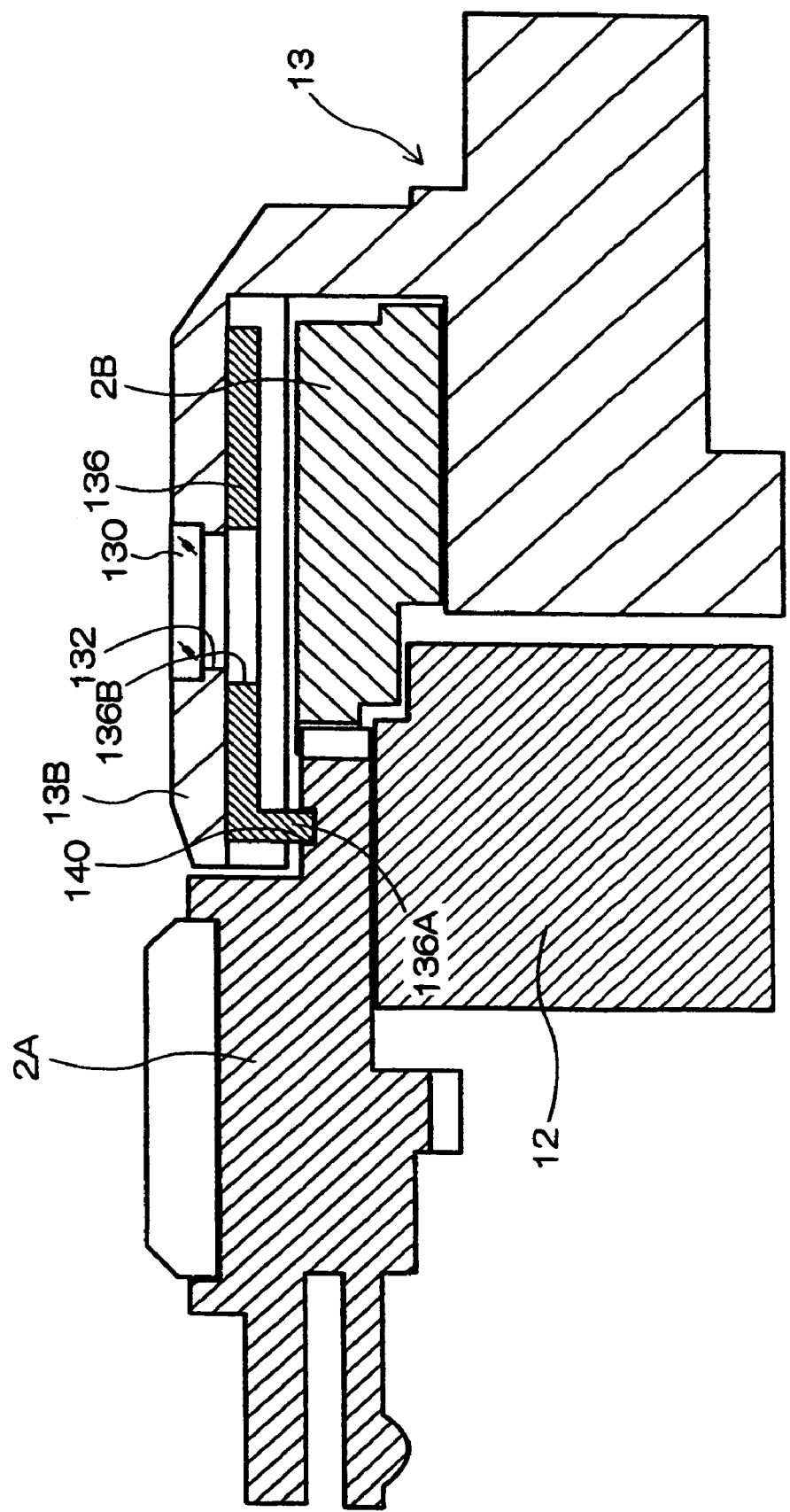
FIG. 9 is a side sectional view showing a section passing through a window provided at the cover portion of the fixing member in peripheral portions of the first focus ring and the second focus ring and the side sectional view showing a state where the first focus ring is set to the rear-side specified position.
Figure 10:
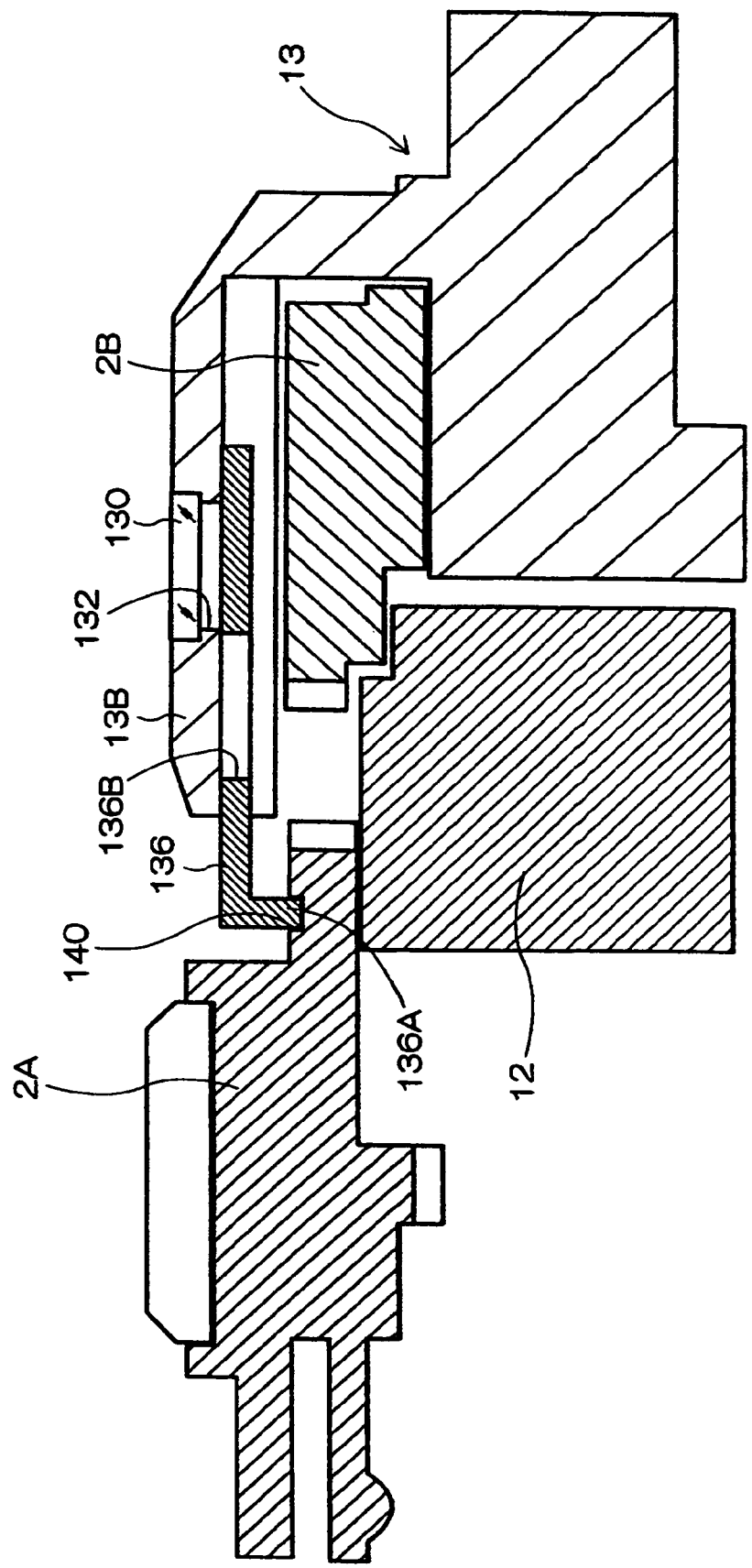
FIG. 10 is a side sectional view showing a section passing through the window provided at the cover portion of the fixing member in peripheral portions of the first focus ring and the second focus ring and the side sectional view showing a state where the first focus ring is set to the front-side specified position.

FIG. 8 is an enlarged exploded perspective view showing a peripheral portion of the window 130 where the photographing distance is indicated in the second focus ring 2B and the cover portion 13B of the fixing member 13, and FIGS. 9 and 10 are side sectional view showing a section through the window 130 of the cover portion 13B of the fixing member 13 in a periphery portion of the first focus ring 2A and the second focus ring 2B. As shown in FIG. 8, a value of the photographing distance according to the rotation position is marked on the outer circumference portion of the second focus ring 2B. On the other hand, on the cover portion 13B of the fixing member 13, a rectangular hole penetrating from the inner circumferential face to the outer circumferential face is formed as shown in FIGS. 9 and 10, and the window 130 shown in FIGS. 8 to 10 (and FIG. 1) is mounted on the outer circumferential face side. By this, the value of the photographing distance marked on the second focus ring 2B can be visually checked through the window 130 of the cover portion 13B. Also, an index showing the value of the photographing distance corresponding to the rotation position among values of the photographing distances marked on the second focus ring is marked on the outer circumferential face of the cover portion 13B as shown in FIG. 8. When the first focus ring 2A is set to the rear-side specified position and the focus operation by the absolute position instruction type second focus ring 2B is valid, this indication of the photographing distance is valid and the value can be checked through the window 130.

On the other hand, when the first focus ring 2A is set to the front-side specified position and the relative position instruction type focus operation is selected, the focus lens 32 is moved to a position not relating to the rotation position of the second focus ring 2B, and the indication of the photographing distance by the second focus ring 2B is invalid. Then, when the first focus ring is set to the front-side specified position as shown in FIG. 10, the window 130 is shielded by a shield plate 136 so as to hide the indication of the photographing distance.

A shield plate 36 is slidably supported in the cover portion 13B of the fixing member 13 in the optical axis O direction along guide grooves 138, 138 formed in the optical axis O direction in the back side (inner circumference side) of the window 130 as shown in FIG. 8. At the tip end portion of this shield plate 136, a projection 136A is formed projecting toward the inner circumferential face side, and this projection 136A is slidably engaged in the circumferential direction with a groove 140 formed at the rear end of the first focus ring 2A as shown in FIGS. 9 and 10. By this, in conjunction with the sliding operation of the first focus ring 2A in the optical axis O direction, the shield plate 136 is slidably operated in the optical axis O direction.

In the shield plate 136, an opening 136B with the size substantially matching the window 130 is formed as shown in FIG. 8, and the position of the opening 136B with respect to the window 130 is moved to the position of the first focus ring 2A.

By this, indication of the photographing distance can be switched to valid or in valid as follows. As shown in FIG. 9, when the first focus ring 2A is set to the rear-side specified position to select the absolute position instruction type focus operation, the opening 136B of the shield plate 136 is arranged at the position of the window 130 (hole 132) so that the value of the photographing distance marked on the second focus ring 2B can be visually checked through the window 130. FIGS. 11A, 11B show elevation views of the window 130 in the cover portion 13B of the fixing member 13 as well as the shield plate 136 of the fixing member 13 which is arranged at the back side of the window 130 and shown as a shaded area, and when the first focus ring 2A is set to the rear-side specified position, as shown in FIG. 11A, the value of the photographing distance of the second focus ring 2B can be visually checked through the window 130, and the value corresponding to the position of the index 134 indicates the currently set photographing distance.

On the other hand, as shown in FIG. 10, when the focus ring 2A is set to the front-side specified position to select the relative position instruction type focus operation, the opening 136B of the shield plate 136 is displaced from the position of the window 130 (hole 132), and the window 130 is shielded by a portion other than the opening 136B of the shield 136. In this case, as shown in FIG. 11B, the value of the photographing distance marked on the second focus ring 2B can not be visually checked.

Therefore, such nonconformity that indication of a wrong photographing distance through the window 130 to have the photographing distance recognized erroneously can be avoided when the relative position instruction type focus operation is selected. Also, which of the relative position instruction type focus operation or the absolute position instruction type focus operation is selected can be also recognized based on whether the photographing distance is indicated through the window 130 or not.

As mentioned above, in the above embodiment, the slidable first focus ring 2A is made as the relative position instruction type focus ring, and the second focus ring 2B covered by the cover member (cover portion 13B of the fixing member 13) is made as the absolute position instruction type focus ring and vice versa. In that case, it is so constructed that the first focus ring 2A of the absolute position instruction type is restricted in the rotation range, but when the first focus ring 2A is slid to be connected to the second focus ring of the relative position instruction type, the restriction of the rotation range of the first focus ring 2A is cancelled.

Also, the present invention can be applied to an optical system used in an arbitrary camera or a lens barrel holding an optical system capable of focus control in an optical system of an arbitrary construction.

What is claimed is:

1. A lens barrel comprising:

a first focus ring, which is a focus ring rotatably arranged on an outer circumference portion of a barrel body holding an optical system capable of focus control and used for either one of instruction types of focus operation of a relative position instruction type focus operation for moving a position of the focus lens for focus control with respect to an optical axis direction in a relative positional relation to a rotation position of the focus ring and an absolute position instruction type focus operation for moving it in an absolute positional relation;

a second focus ring, which is a focus ring arranged rotatably on the outer circumference portion of the barrel body holding the optical system capable of focus control and used for the focus operation of the instruction type different from that of the first focus ring between the relative position instruction type focus operation and the absolute position instruction type focus operation;

a support device which slidably supports the first focus ring in the optical axis direction;

a connecting device which brings the first focus ring and the second focus ring from an unconnected state into a connected state when the first focus ring slidably supported by the support device is slid from a first position to a second position; and a cover member covering the outer circumference portion of the second focus ring.

2. The lens barrel according to claim 1, wherein the first focus ring is used for focus operation of the relative position instruction type and the second focus ring is used for the focus operation of the absolute position instruction type; and an opening is formed on the cover member for visual check of indication of a photographing distance marked on the second focus ring from outside.

3. The lens barrel according to claim 2, further comprising a shielding device which shields the opening when the first focus ring is set to the first position.

4. The lens barrel according to claim 1, wherein, in the relative position instruction type focus operation said first focus ring instructs movement of the focus lens from a current position to a displaced position by a displacement amount according to a ring rotation change amount.

5. The lens barrel according to claim 1, wherein in the absolute position instruction type focus operation said second focus ring instructs movement of the focus lens to a position corresponding to said second focus ring absolute rotation position.

6. The lens barrel according to claim 1, wherein in said unconnected state a rotation of the first focus ring does not influence a rotation of the second focus ring, and in said connected state a rotation of the second focus ring is influenced by a rotation of the first focus ring.

7. The lens barrel according to claim 1, wherein when the first focus ring is set to a rear-side specified position to select the absolute position instruction type, the first focus ring is connected to the second focus ring and the second focus ring can be indirectly operated rotationally by rotational operation of the first focus ring.

8. The lens barrel according to claim 1, wherein said connecting device includes gears associated said first focus ring and said second focus ring, wherein in said unconnected state the connection of said gears is released so that when the first focus ring is rotationally operated, the second focus ring is not rotated, and in said connected state said gears are connected and when the first focus ring is rotationally operated, the second focus ring is rotationally operated indirectly by the rotational operation of the first focus ring.

9. The lens barrel according to claim 1, wherein when the first focus ring is set to a rear-side specified position and the focus operation by the absolute position instruction type is selected, an indication of the photographing distance on an indicator is valid, and when the first focus ring is set to a front-side specified position and the relative position instruction type focus operation is selected, an indication of the photographing distance on said indicator by the second focus ring is invalid.

* * * * *